United States Patent [19]

Plesinger

[11] Patent Number: 5,179,459
[45] Date of Patent: Jan. 12, 1993

[54] METHODS FOR ADHERING MULTIPLE STACK LIQUID CRYSTAL DISPLAY PANELS

[75] Inventor: Boris Plesinger, Tomball, Tex.

[73] Assignee: Compaq Computer Corporation, Houston, Tex.

[21] Appl. No.: 724,524

[22] Filed: Jun. 28, 1991

[51] Int. Cl.⁵ .............................................. G02F 1/13
[52] U.S. Cl. ...................................... 359/74; 359/53; 359/83
[58] Field of Search .................... 359/53, 80, 83, 74

[56] References Cited

U.S. PATENT DOCUMENTS

| | | | |
|---|---|---|---|
| Re. 32,521 | 10/1987 | Fergason | 359/53 |
| 3,992,082 | 11/1976 | Katz | 359/53 |
| 4,228,574 | 10/1980 | Culley et al. | 359/54 |
| 4,508,427 | 4/1985 | Ross | 359/53 |
| 4,580,876 | 4/1986 | Stolov et al. | 359/53 |
| 4,610,507 | 9/1986 | Kamamori et al. | 359/53 |
| 4,838,653 | 6/1989 | Mohebban | 359/63 |
| 4,892,390 | 1/1990 | Funada et al. | 359/53 |
| 4,917,465 | 4/1990 | Conner et al. | 359/53 |
| 4,927,240 | 5/1990 | Stolov et al. | 359/53 |
| 4,966,441 | 10/1990 | Conner | 359/53 |

Primary Examiner—William L. Sikes
Assistant Examiner—Huy K. Mai
Attorney, Agent, or Firm—Synnestvedt & Lechner

[57] ABSTRACT

Color flat screen displays and methods of fabricating color flat screen displays. Color flat screen displays described herein comprise at least two liquid crystal display panels, each of said panels containing pixels which are substantially aligned, adhesive gaskets formed on a periphery of one side of a first of the two liquid crystal display panels for providing a mechanical connection between the first panel and the second liquid crystal display panel, and a cavity disposed between the first and second liquid crystal display panels formed by the thickness of the adhesive gasket, the cavity being adapted to receive a material for optically matching pixels in the first panel to pixels in the second panel. Color flat screen displays described herein allow for efficient and economical fabrication and also are rugged and sturdy due to the new fabrication methods which are employed.

20 Claims, 5 Drawing Sheets

METHODS FOR ADHERING MULTIPLE STACK LIQUID CRYSTAL DISPLAY PANELS

FIELD OF THE INVENTION

This invention relates generally to flat screen displays. More specifically, this invention relates to flat screen displays which use liquid crystal display panels and methods of fabricating flat screen displays using liquid crystal display panels.

BACKGROUND OF THE INVENTION

Liquid crystal display (LCD) panels are used in many electronic devices to provide an output display of information. As is known by those with skill in the art, conventional LCD fabrication generally involves conductively coating two pieces of patterned glass and placing a liquid crystal material therebetween. A sealant is introduced to enclose the liquid crystal material between the processed glass pieces. The glass is then further processed by means of a photolithographic process into a conductively coated glass piece with selective etching of the conductive areas. An alignment layer is then applied in an orientation necessary to effect a twisted nematic LCD. Usually, the second conductively coated piece of glass is similarly processed with a different electrode pattern and with an alignment layer oriented transverse to the direction of the alignment layer on the first piece of conductively coated glass. Polarizers are often used which are aligned with and adhere to each of the first and second glass surfaces Such LCDs are described in U.S. Pat. No. 4,228,574, Culley et al. at column 1, line 65 through column 2, line 24.

LCDs for use in computer and other types of electronic output displays typically provide a single gray output when the liquid crystal material is charged to its characteristic capacitance to provide output data. It has recently been desirable to provide color displays to electronic devices so that color output can be obtained which is much more pleasing to the eye, and which allows for more detailed and contrasting data to be displayed from the electronic device. In order to make color displays using LCDs, a number of LCDs may be stacked on top of one another to produce such a display. These displays are called "color flat screen displays" and usually contain three individual LCD panels, one for each color; red, green, and blue. The three LCD panels must be mutually aligned such that pixels in each of the LCDs are aligned at the exact location on all three panels.

To minimize a loss of brightness due to light passing through different media corresponding to different colors for each of the three panels, the individual panels are attached together by an adhesive, optically matched material. As the light from an illuminating source passes through the stacked layers, pixels in each panel act as controllable color filters selectively coloring the light exiting the display. This fabrication technique is one of the most common methods of making color flat screen displays using LCD panels. See U.S. Pat. No. 4,917,465, Conner et al., and U.S. Pat. No. 4,966,441, Conner. Stacked LCD displays have drawbacks, for example, parallax, which is found in any stacked optical system. Furthermore, stacked LCDs also provide poor brightness due to absorption of light by the dye in a dyed cell system, and due to blockage of cross-polarized light by polarizers in stacked systems that rely on polarization rotation to differentiate colors. See Conner et al. at column 1, lines 41-47.

A second common approach to fabricating color flat screen displays utilizes a single LCD panel in conjunction with a mosaic colored filter. The mosaic filter typically has a plurality of red, green, and blue filter elements each aligned with a pixel in the single LCD panel. By controlling the transmissivity of pixels in the LCD panel, the display can pass light through selected areas of the color mosaic filter. However, in a color mosaic LCD display, brightness is limited because less than a third of the active area transmits light for any given color. Furthermore, pixel density must be increased by a factor of three to obtain the same resolution as the stacked panel approach. See the Conner et al. patent at column 1, lines 48-66, and the Conner patent at column 1, lines 33-52.

A third approach to fabricating prior color flat screen displays is to use the "birefringence" of color concept which takes advantage of birefringent layers of a liquid crystal material. The birefringent effect is sometimes called "electrically controlled birefringence" or "tunable birefringence" and generally requires applying voltages of different values to a liquid crystal material which will then exhibit different colors based on the different voltages applied. See the Conner et al. patent at column 1, line 67 through column 2, line 17.

It is necessary in birefringent systems to distinguish pixels driven by an "on" voltage from those driven by an "off" voltage. In order to accomplish this distinction, polarizers are used, one to polarize the entering light to a known polarization, and one to select only one polarization of exiting light for examination. See Conner et al. column 2, line 62 through column 3, line 5. Thus, the prior birefringent color flat screen displays as disclosed in the Conner et al. and Conner patents require the use of multiple layer polarizers and color filter elements to provide the full range of color to distinguish between on and off pixels, and to provide suitable brightness to make the LCD screen a viable display device.

In the stacked LCD color flat screens discussed earlier, an adhesive is used to hold the plurality of panels together in the flat screen display. A secondary purpose of the adhesive is to prevent misalignment of the pixels in each of the displays and especially during the manufacturing process. Because the adhesive itself is used to prevent misalignment, the manufacturing process can become very tedious and time consuming, and is also prone to rejects since the surfaces of the LCD panels must be attached, that is, glued together, without air pockets or bubbles. This further requires the need for "clean room" manufacturing since any dust particle or foreign substance which may attach to the tacky surface of the glue or adhesive represents a flaw, and therefore a reject in the manufacturing process.

During the fabrication of such stacked LCD flat color displays, special care must be made during the alignment of the panels since the large area of the glue does not allow for extraneous movement. Prior processes of manufacturing and fabricating color flat screen displays are also prone to induce stresses in the panels thereby producing faults, and any repair or exchange of the faulty panel is not possible.

Laminating liquid crystal material between support members with optically neutral adhesives to make LCD panels is known. See U.S. Pat. No. 4,838,653, Mohebban, at column 8, lines 11-23. In the Mohebban patent, it is taught that an LCD may be fabricated by sandwiching a liquid crystal material between two layers of MYLAR support material. Conductors are etched on the surfaces of the two MYLAR support members and one of the MYLAR support members is then coated on the conductor side with liquid crystal material mixed with an encapsulating medium. This makes the layer of liquid crystal encapsulating medium tacky so that it can be cured in an oven to produce a laminated construction. In this fashion, a LCD with a plurality of liquid crystal elements connected in series can be fabricated. However, the Mohebban patent does not provide a method of fabricating color flat screen displays, and describes a fabrication method which is particularly suited for producing LCD sensors to detect static electricity. See, e.g., column 9, lines 42-50 of the Mohebban patent.

Thus, prior methods of fabricating color flat screen displays fail to provide efficient and economical methods of fabricating display devices utilizing LCD panels. There exists a long-felt need in the art for methods of stacking LCD panels to form color flat screen displays in an expeditious manner. There is a further long-felt need in the art for color flat screen displays which are simple to manufacture, which do not exhibit flaws incurred in the manufacturing process, and which reduce the overall complexity of fabrication.

SUMMARY OF THE INVENTION

Flat screen displays and methods of fabricating flat screen displays provided in accordance with the present invention solve the aforementioned long-felt needs in the art. Flat screen displays described and claimed herein provide for simple and efficient fabrication and enhanced display of information to be shown on the flat screen. Methods of fabricating flat screen displays provided in accordance with this invention give the further advantage of allowing easy installation of the input/output (I/O) connections between the individual LCD panels and the associated electronics which drive the flat screen displays. Such results and advantages have not heretofore been achieved with prior flat screen displays and evince significant improvements over the displays which have been used in the past.

Methods of manufacturing displays in accordance with the present invention comprise the steps of providing at least two liquid crystal display panels adapted to be optically interfaced when the panels are joined such that pixels in the panels are substantially aligned, applying an adhesive to a specified thickness on a periphery of a first of said at least two liquid crystal display panels to form an adhesive gasket on said first panel, aligning a second of said at least two liquid crystal display panels to the first panel by substantially matching corresponding pixels in the first and second panels, and pressing the first and second panels together such that the adhesive on the periphery of the first side of the first panel causes the first and second panels to be connected together.

Furthermore, flat screen displays in accordance with the present invention comprise at least two liquid crystal display panels, each of said panels containing pixels which are substantially aligned, first adhesive gasket means having a thickness formed on a periphery of one side of a first of the at least two liquid crystal display panels for joining the first panel and a second of the at least two liquid crystal display panels, and a first cavity disposed between the first and second liquid crystal display panels formed by the thickness of the adhesive gasket means, the first cavity being adapted to receive a material for optically matching pixels in the first panel to pixels in the second panel. Flat screen displays provided in accordance with the present invention will be better understood with reference to the following detailed description read in conjunction with the drawings.

DETAILED DESCRIPTION OF PREFERRED EMBODIMENTS

Figure 1:
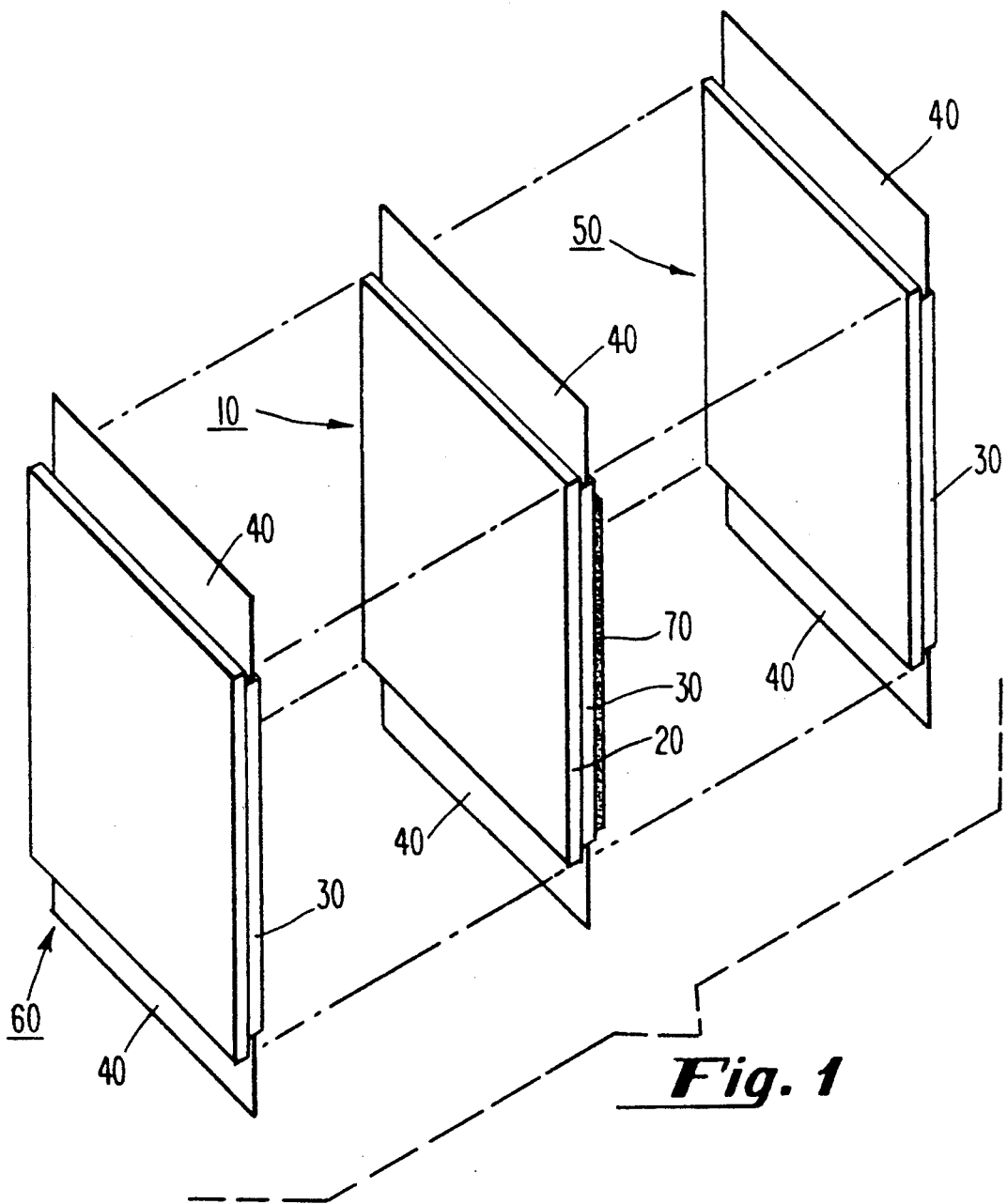
FIG. 1 is an isometric, exploded view of color flat screen displays provided in accordance with the present invention showing individual LCD panels for use in the color flat screen displays.

Referring now to the drawings wherein like reference numerals refer to like elements, FIG. 1 shows a color flat screen display which comprises a plurality of liquid crystal display panels to be connected together. A first LCD panel 10 comprises a LCD 20 which is prepared according to standard fabrication techniques such as those disclosed in, for example, U.S. Pat. No. 4,228,574, Culley et al., at column 1, line 65 through column 2, line 23, the teachings of which are specifically incorporated herein by reference. LCD panels which can be used in the practice of the invention disclosed and claimed herein can be obtained from In Focus Systems, Inc. of Tualatin, Oreg., or the Sharp Corporation. LCD panel 10 further comprises an electronic I/O board 30 also conventionally fabricated on the LCD 20. The electronic I/O board 30 has electronic connectors 40 attached thereto which interface the LCD panel 10 with the appropriate electronics in the display device, and further to the computer or other electronic device with which the flat screen display operates.

In a preferred embodiment, the flat screen display comprises two other LCD panels in addition to the first LCD panel 10. A second LCD panel 50 and a third LCD panel 60 have a similar construction with similar electronics boards 30 and I/O connectors 40. In accordance with the present invention, a first adhesive gasket 70 is applied to a specified thickness on the periphery of the first LCD panel 10 such that LCD panel 50 can be adhered to LCD panel 10 after the pixels in LCD panel 10 and LCD panel 50 have been aligned. A second adhesive gasket (not shown in FIG. 1) can be similarly prepared on an opposite side of LCD panel 10 from the side which has been previously prepared with adhesive gasket 70 so that LCD panel 60 can be aligned with and adhered to LCD panel 10 after the pixels in these two panels have been aligned. In still further preferred embodiments, the three LCD panels 10, 50 and 60 correspond to the red, green, and blue colors in a color flat screen display provided in accordance with the present invention.

Figure 2:
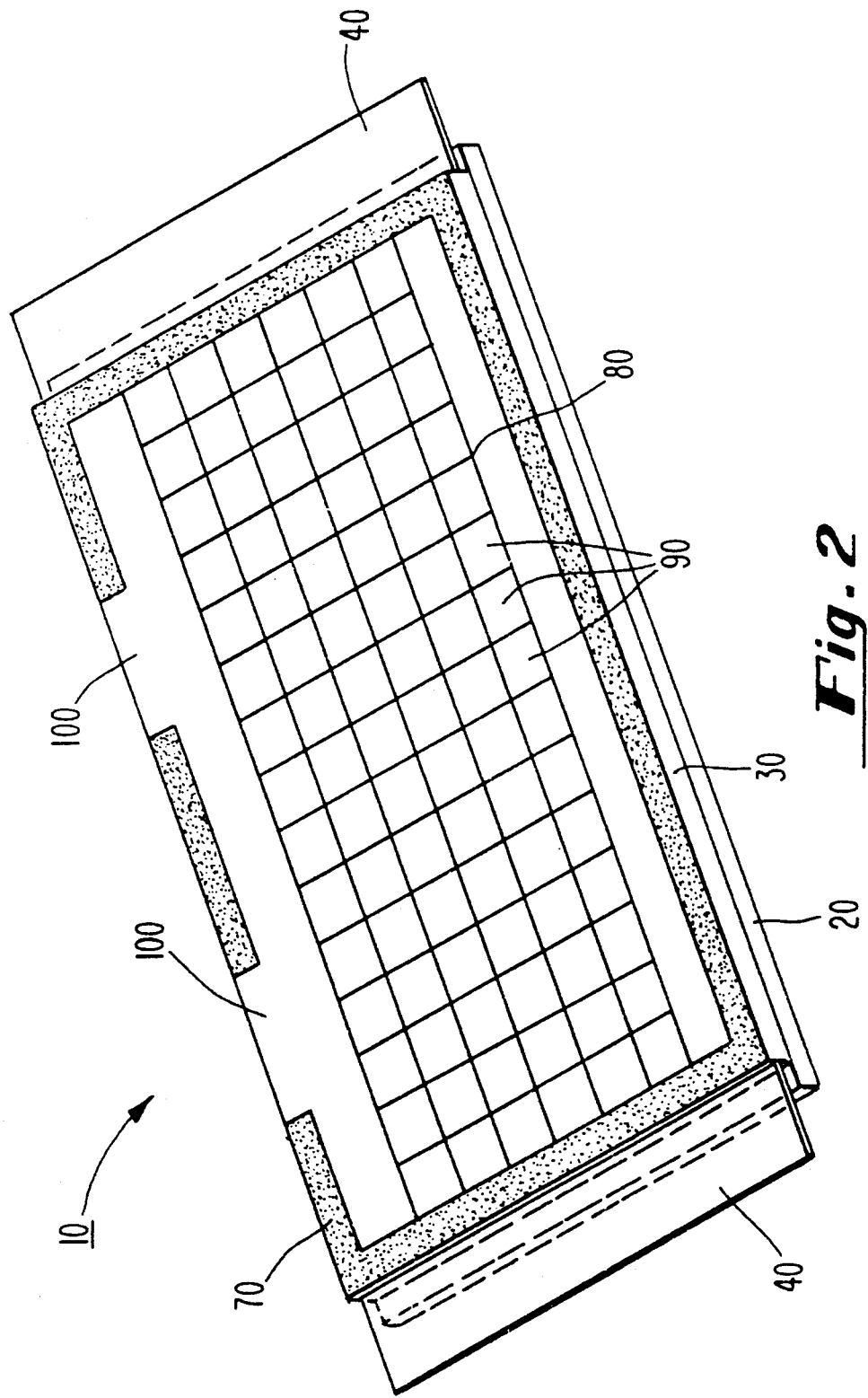
FIG. 2 is an individual LCD panel having an adhesive gasket in accordance with the present invention applied on the periphery of the panel.

In FIG. 2, the LCD panel 10 is shown with electronics board 30 fabricated on the LCD 20. Adhesive gasket 70 preferably covers substantially the periphery of a first side of the LCD panel construction which in this exemplary embodiment corresponds to the electronics board 30 side of the LCD panel 10. In accordance with the present invention, the adhesive gasket 70 need only coat the periphery of the panel 10 and is preferably applied on a narrower side of the panel to provide a shorter gasket. A wide range of adhesives may be used to fabricate the color flat screen display and the optical quality of the adhesive is not critical since the adhesive does not coat the entire panel, and thus will not obscure light transmitted therethrough when the display is in operation. In particular, an ultraviolet (UV) epoxy material such as, for example, UV-15 epoxy or UV10TK-1 epoxy, both available from the Master Bond Co., are suitable for the adhesive gasket. Since the optical quality of the adhesive is not critical, flat screen displays in accordance with the present invention will be cheaper to fabricate as compared to previous multiple stack LCD panel flat screen displays.

For illustrative purposes, a pixel matrix 80 is shown on LCD panel 10 comprising individual pixels 90. As known by those with skill in the art, the pixels 90 form the images on color flat screen displays according to data received through the I/O connectors 40 to the individual LCD panels in the color flat screen display.

The first adhesive gasket 70 coated on the periphery of the LCD panel 10 is preferably applied so that two spaces 100 along the portions of the periphery of the LCD panel are left substantially free of the adhesive material. Once panel 10 is bonded to the second LCD panel, spaces 100 provide an opening for a cavity which will be formed between the two panels which is then fillable with an optical grade material to complete the color display fabrication process. Spaces 100 can appear at any point along the periphery and in the exemplary case of two spaces, provides an optimum cavity between the LCD panels for filling. It will be recognized, however, that either less than two spaces or more than two spaces may be provided for creating the cavity depending upon the particular configuration desired for the color flat screen display, and the particular size of the individual LCD panels employed in the fabrication process.

Figure 3:
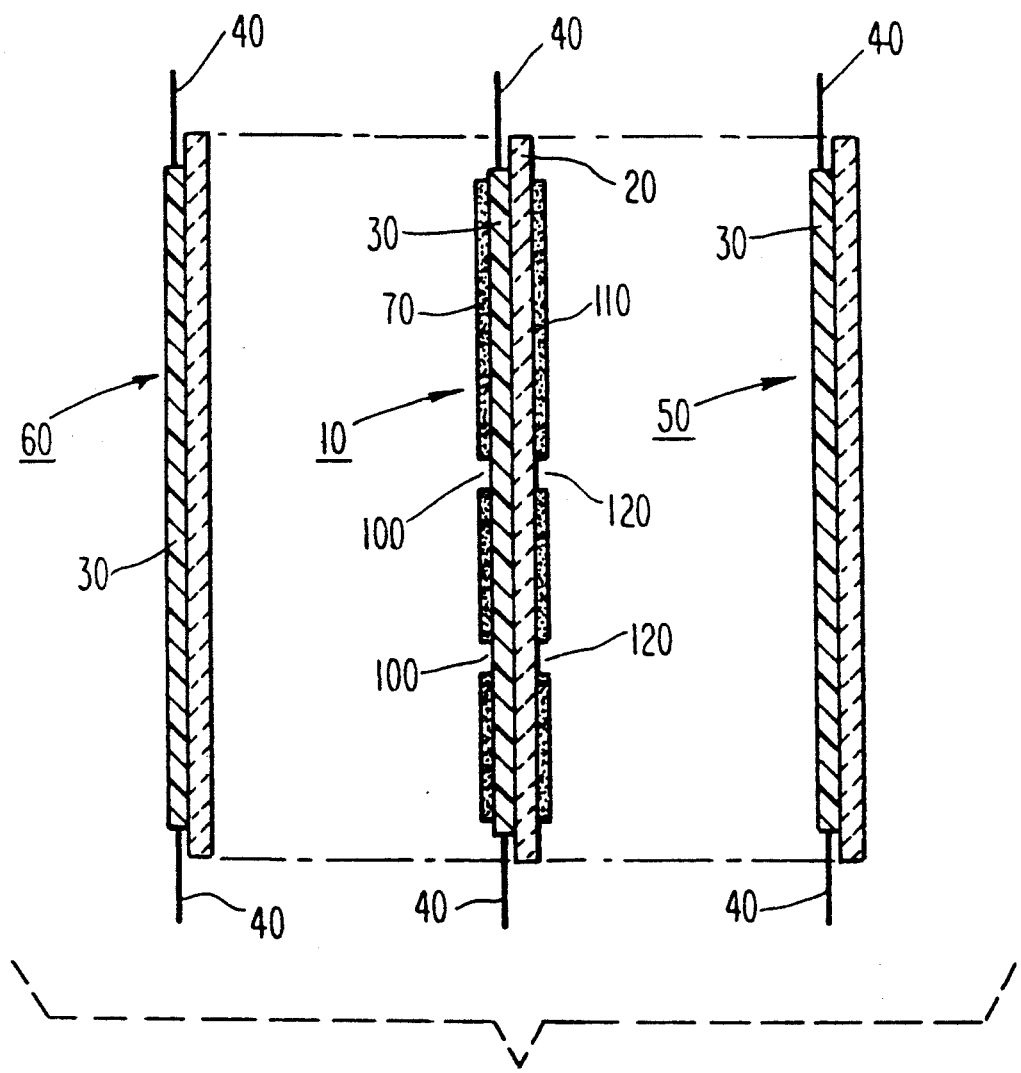
FIG. 3 is a cross-sectional exploded view of a color flat screen display having an LCD panel with two adhesive gaskets applied to separate sides of the LCD panel for adhering the LCD panels together.

Referring now to FIG. 3, a cross-sectional view of the individual LCD panels 10, 50 and 60 are shown wherein the first LCD panel 10 has an adhesive gasket 70 applied to the periphery of its first side. Spaces 100 are provided in adhesive gasket 70 so that a first cavity can be formed between LCD panel 10 and LCD panel 60 when the color flat screen display is fabricated. Additionally, a second adhesive gasket 110 is applied to the periphery of the second side of LCD panel 10 so that LCD panel 10 and LCD panel 50 can be similarly adhered together during the fabrication process. As with the first adhesive gasket 70 having spaces 100 applied on the first side of LCD panel 10, spaces 120 are left in adhesive gasket 110 applied on the second side of LCD panel 10. This will allow a fillable cavity to also be formed between LCD panel 10 and LCD panel 50 during the fabrication process. The two cavities will have volumes that are dependent on the thickness of adhesive gaskets 70 and 110.

The two cavities thus formed will cover substantially the entire area of the LCD panels 10, 50 and 60 and will contain a volume of optical material sufficient to match the pixels between the panels when the cavities are filled. The optical material is preferably a liquid optical material so that the two cavities can be easily filled. Preferably, the optical material has an index of refraction close to the index of refraction of glass, approximately 1.5. In a preferred embodiment, the optical material is 1 VINYL 2 PYRROLIDINONE, available from the Kodak Company.

Figure 4A:
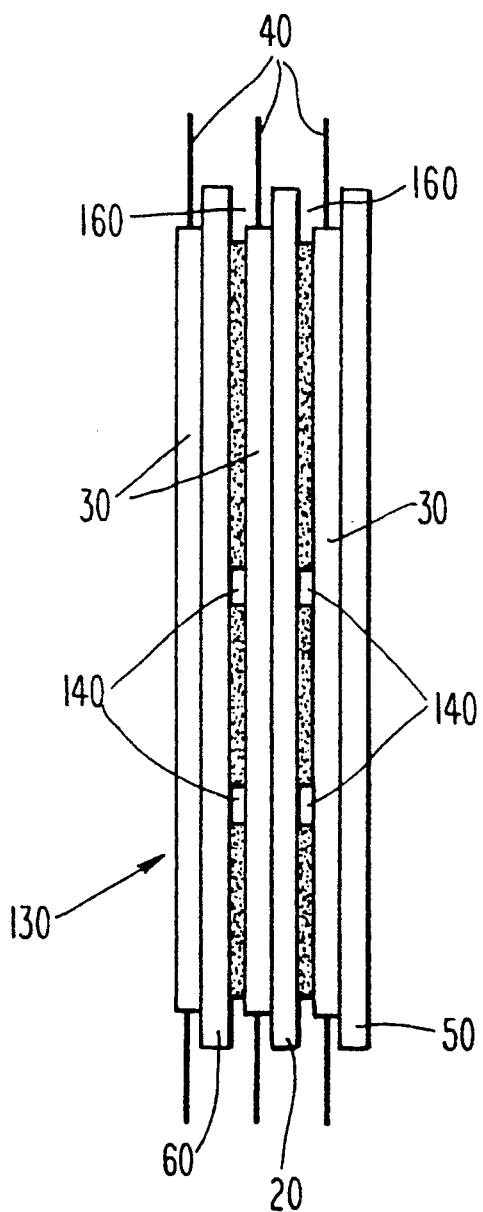
FIGS. 4A and 4B illustrate a color flat screen display having adhesive gaskets and seals provided in accordance with the present invention.
Figure 4B:
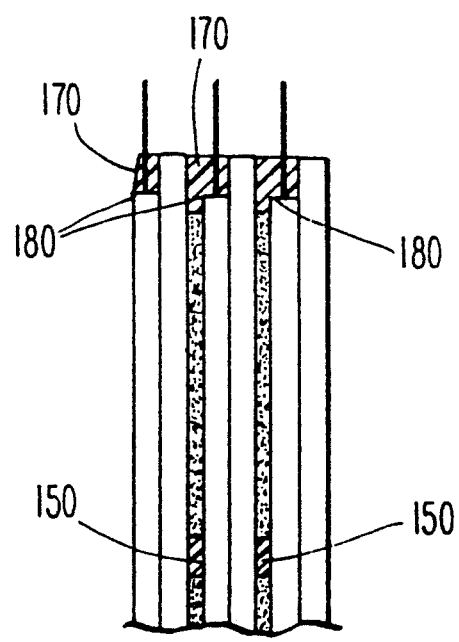

When the LCD panels 10, 50 and 60 are adhered together, a color flat screen display is fabricated as shown at 130 in FIG. 4A. The adhesive gaskets 70 and 110 having sufficient thicknesses form a first cavity between LCD panels 10 and 50, and a second cavity between LCD panels 10 and 60. These cavities are accessible through filling openings 140. An optical fluid having an index of refraction similar to the support members comprising the LCDs in LCD panels 10, 50 and 60 is introduced to the cavities through openings 140. After the optical fluid fills the cavities, filling openings 140 are preferably sealed with an appropriate sealant as shown at 150 in FIG. 4B. The sealant is preferably either UV-15 or UV 10TK-1. The color flat screen display is then ready for installation into a display unit which is usually interfaced with a computer, or other appropriate electronic device.

Optionally, second seals 170 can be applied by filling the spaces 160 formed between the LCD panels 10 and 50, and 10 and 60, respectively. Second seals 170 are preferably accomplished after the cavities are filled, and the filling openings 140 are sealed. The second seals 170 are accomplished by applying a bead of sealant around the displays stacked LCD panels. The second seal is preferably made with RTV silicone rubber, available from the General Electric Company.

Seals 170 preferably serve a dual purpose. The first purpose is to enhance the gasket seal formed by the adhesive material in gaskets 70 and 110, and to enhance the integrity of seal 150 in filling openings 140. The second purpose of seals 170 is to provide a pressure hold down of the I/O connectors 40 at the points 180 where I/O connectors 40 mate with the electronic boards 30. This is desirable since the I/O connection points 180 are particularly fragile and susceptible to damage during handling, and during the fabrication process.

Figure 5A:
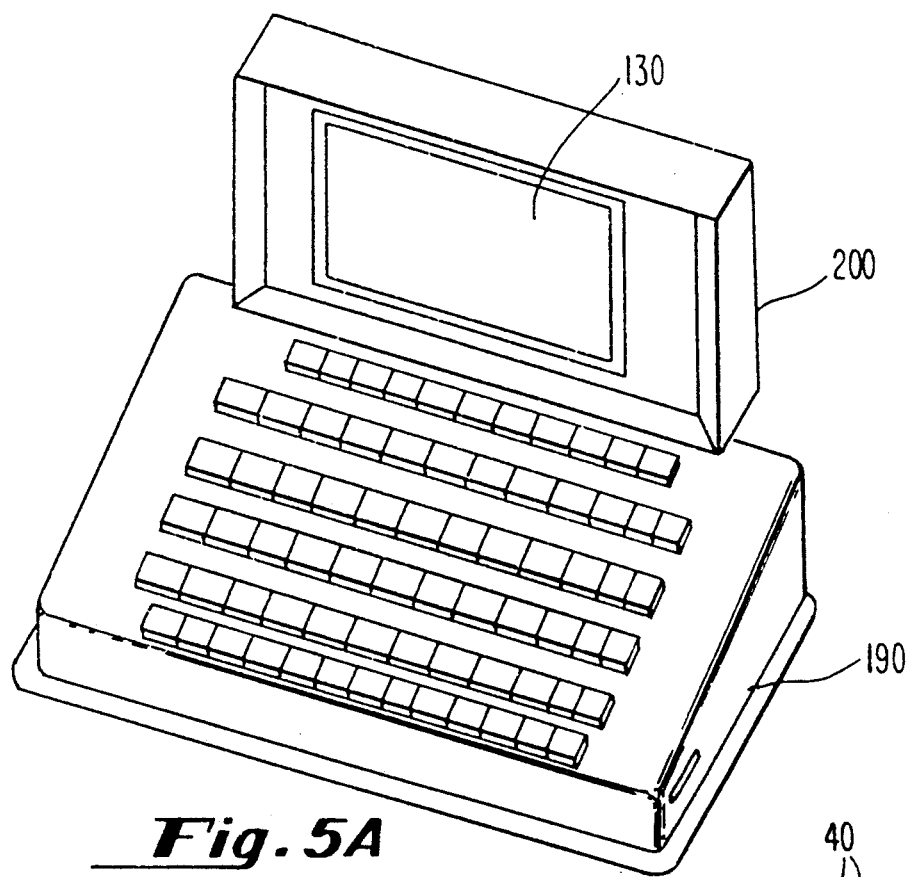
FIGS. 5A and 5B illustrate a laptop computer utilizing a color flat screen display provided in accordance with the present invention.

After fabrication, it is preferable to install color flat screen display 130 in an appropriate electronic device requiring an output display. Referring to FIG. 5A, the electronic device can be a computer 190, which is preferably a "laptop" computer that has particular needs for a low power, LCD color flat screen device. Color flat screen display 130 is installed in a display housing 200 which is further interfaced with the laptop computer 190 in a collapsible mode. Due to the thin and lightweight nature of the color flat screen display 130, the laptop computer 190 is kept sufficiently light, easy to carry, and is also readily powered by the limited battery-type power supplies which are usually found in laptop computers. Furthermore, since LCD panels are used to fabricate the color flat screen 130 in accordance with the present invention, high clarity color displays are available for laptop computer 190. While color flat screen displays 130 are particularly useful for laptop computers, they are equally useful for any type of computer or electronic device that requires a color flat screen display.

Figure 5B:
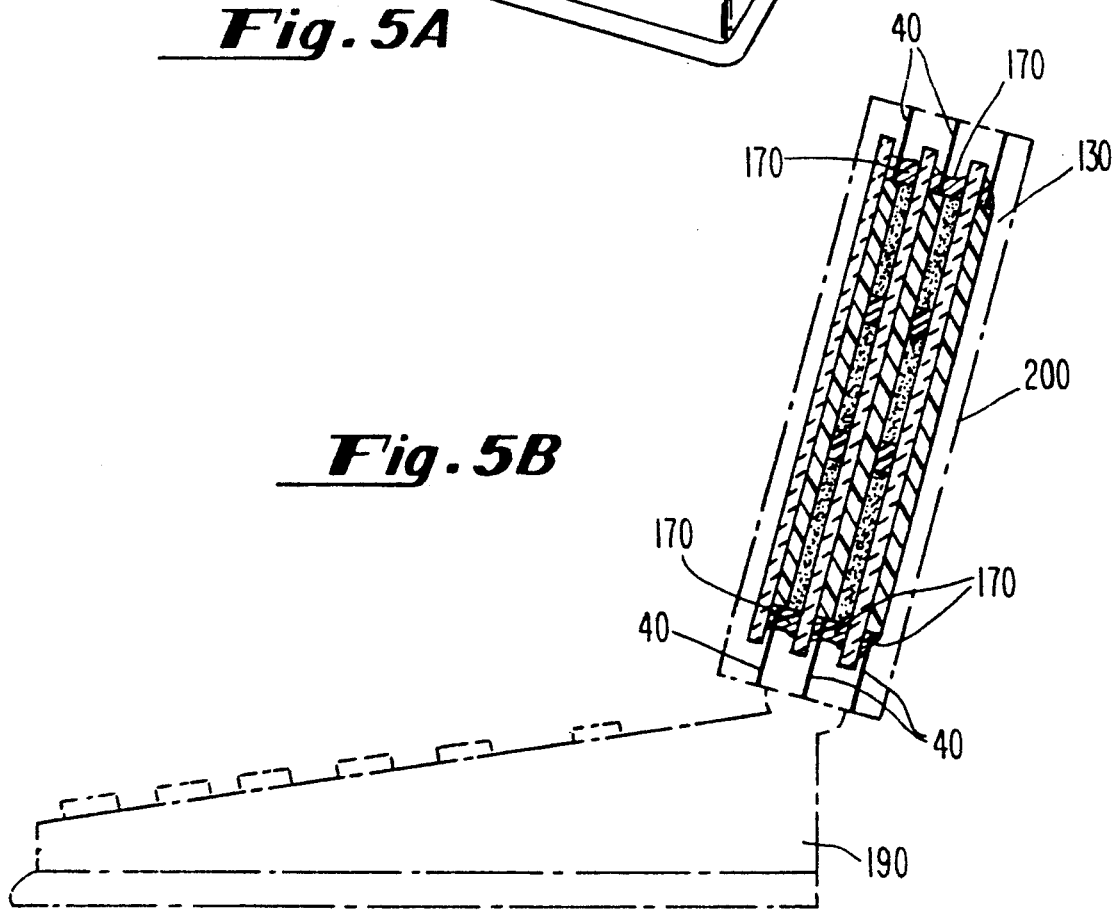

Referring to FIG. 5B, laptop computer 190 and display housing 200 are shown after color flat screen display 130 has been inserted into the housing 200. Color flat screen display 130 is easily illuminated with a standard illuminating lamp to provide color images, and is particularly useful for providing high quality color images for the laptop computer 190. The ease of fabrication associated with color flat screen display 130 reduces the overall costs of laptop computer 190 and further reduces chances for color flat screen 130 to fail due to fabrication flaws, or other problems heretofore associated with color flat screen displays. Additionally, the efficient nature of the adhesive gasket fabrication process described herein gives color flat screen displays in accordance with the present invention longer operational lives than previous color flat screen displays. Furthermore, second seals 170 for providing a pressure hold down of I/O connectors 40 to the electronics boards of the individual LCD panels allow for easy insertion of color flat screen display 130 in the housing 200 and makes the display 130 less susceptible to failure as laptop computer 190 is transported in the normal course of its use. Such advantages have not heretofore been realized with color flat screen displays that have previously been fabricated and evince highly unexpected and advantageous results.

There have thus been described in accordance with the present invention preferred embodiments of color flat screen displays and their fabrication. While preferred embodiments have been described and disclosed, it will be recognized by those with skill in the art that modifications are within the true spirit and scope of the invention. The appended claims are intended to cover all such modifications.

What is claimed is:

1. A method for laminating multiple liquid crystal display panels, comprising the steps of:
   providing at least two liquid crystal display panels adapted to be optically interfaced when the panels are joined such that pixels in the panels are substantially aligned;
   applying an adhesive to a specified thickness on a periphery of a first of said at least two liquid crystal display panels to form a first adhesive gasket on said first panel;
   aligning a second of said at least two liquid crystal display panels to the first panel by substantially aligning corresponding pixels in the first and second pixels; and
   pressing the first and second panels together such that the adhesive on the periphery of the first side of the first panel causes the first and second panels to be laminated together.

2. The method recited in claim 1 further comprising the steps of:
   providing a third liquid crystal display panel adapted to be optically interfaced with the first liquid crystal display panel when the first and third liquid crystal display panel are joined such that pixels in the first and third liquid crystal display panels are substantially aligned;
   applying an adhesive to a specified thickness on a periphery of a second side of the first liquid crystal display panel to form a second adhesive gasket on the second side of the first liquid crystal display panel;
   aligning the third liquid crystal display panel to the first liquid crystal display panel by substantially aligning corresponding pixels in the first and third panels; and
   pressing the first and third panels together such that the adhesive on the periphery of the second side of the first panel causes the first and third panels to be laminated together.

3. The method recited in claim 2 wherein the first and second adhesive gaskets are applied to the peripheries of the first and second sides of the first panel such that a space is left along the peripheries of the two sides of the first panel substantially free of the adhesive.

4. The method recited in claim 3 wherein a first cavity is formed between the first and second panels when the first and second panels are pressed together whereby the first cavity is accessible through an opening formed in the display at the space along the periphery of the first side of the first panel which is left substantially free of the adhesive.

5. The method recited in claim 4 wherein a second cavity is formed between the first and third panels when the first and third panels are pressed together whereby the second cavity is accessible through an opening formed in the display at the space along the periphery of the second side of the first panel which is left substantially free of the adhesive.

6. The method recited in claim 5 further comprising the step of filling the first and second cavities with an optical material adapted to match pixels in the first panel to pixels in the second and third panels.

7. The method recited in claim 6 further comprising the step of sealing the openings which are formed in the display at the spaces along the periphery of the first and second sides of the first panel which have been left substantially free of the adhesive.

8. A method for laminating multiple liquid crystal display panels comprising the steps of:
   providing at least two liquid crystal display panels containing pixels wherein the pixels on the liquid crystal display panels are substantially optically alignable;
   applying an adhesive along a periphery of a first side of a first of the at least two liquid crystal display panels to form a gasket but leaving at least two spaces along the periphery substantially free of the adhesive;
   aligning a second of the at least two liquid crystal display panels with the first side of the first panel by substantially aligning corresponding pixels in the first and second panels;
   adhering the second panel to the first panel at the adhesive gasket on the first side of the first panel, thereby forming a mechanical bond between the first and second panels along the adhesive gasket on the first side; and
   allowing a first cavity to be formed between the first and second panels when the first and second panels are adhered together whereby the first cavity is accessible through at least two openings formed in the color flat screen display at the two spaces along the periphery of the first side of the first panel which is left substantially free of the adhesive.

9. The method recited in claim 8 further comprising the step of applying an adhesive along a periphery of a second side of the first liquid crystal display panel to form a gasket but leaving at least two spaces along the periphery of the second side of the first panel substantially free of the adhesive.

10. The method recited in claim 9 further comprising the step of aligning a third liquid crystal display panel with the second side of the first panel by substantially aligning corresponding pixels in the first and third panels.

11. The method recited in claim 10 further comprising the step of adhering the third panel to the first panel at the adhesive gasket on the second side of the first panel, thereby forming a mechanical bond between the first and third panels along the adhesive gasket on the second side.

12. The method recited in claim 11 further comprising the step of allowing a second cavity to be formed between the first and third panels when the first and third panels are adhered together whereby the second cavity is accessible through at least two openings formed in the color flat screen display at the two spaces along the periphery of the second side of the first panel which is left substantially free of the adhesive.

13. The method recited in claim 12 further comprising the step of filling the first and second cavities with an optical material adapted to match the pixels in the first panel to the pixels in the second and third panels.

14. The method recited in claim 13 further comprising the steps of sealing the openings formed in the color flat screen display at the two spaces along the periphery of the first panel which is adhered to the second panel and the two openings formed in the color flat screen display at the two spaces along the periphery of the first panel which is adhered to the third panel.

15. The method recited in claim 14 further comprising the step of sealing spaces formed between the first and second panels and the first and third panels during fabrication of the color flat screen display with a sealant to provide a pressure hold down of electronic connectors interfaced with the three liquid crystal display panels.

16. A flat screen display comprising:
 at least two liquid crystal display panels, each of said panels containing pixels which are substantially aligned;
 first adhesive gasket means having a thickness formed on a periphery of one side of a first of the at least two liquid crystal display panels for joining the first panel and a second of the at least two liquid crystal display panels; and
 a first cavity disposed between the first and second liquid crystal display panels formed by the thickness of the first adhesive gasket means, the first cavity being adapted to receive a material for optically aligning pixels in the first panel to pixels in the second panel.

17. The flat screen display recited in claim 16 further comprising a third liquid crystal display panel containing pixels which are substantially aligned with the pixels in the first and third panels.

18. The flat screen display recited in claim 17 further comprising second adhesive gasket means having a thickness formed on a periphery of a second side of the first liquid crystal display panel for joining the first panel and the third panel.

19. The flat screen display recited in claim 18 further comprising a second cavity disposed between the first and third liquid crystal display panels formed by the thickness of the second adhesive gasket means, the second cavity being adapted to receive a material for optically matching pixels in the first panel to pixels in the third panel.

20. The flat screen display recited in claim 19 further comprising an optical material filling the first and second cavities for matching pixels in the first panel with pixels in the second panel and for matching pixels in the first panel to pixels in the third panel.

* * * * *

UNITED STATES PATENT AND TRADEMARK OFFICE
CERTIFICATE OF CORRECTION

PATENT NO. : 5,179,459

DATED : Jan. 12, 1993

INVENTOR(S) : Boris Plesinger

It is certified that error appears in the above-identified patent and that said Letters Patent is hereby corrected as shown below:

<u>Title page at [73]</u>, "Compag" should read --Compaq--.

<u>Column 1, line 32</u>, after "surfaces" insert a period.

<u>Column 6, line 35</u>, "displays" should read --display's--.

<u>Column 3, line 9</u>, "a" should read --an--.

<u>Column 4, line 34</u>, "a" should read --an--.

<u>Column 7, line 59</u>, "panel" should read --panels--.

Signed and Sealed this

Twenty-third Day of November, 1993

Attest:

BRUCE LEHMAN

*Attesting Officer*  *Commissioner of Patents and Trademarks*